G. WILLARD.
Steam Plow.
No. 63,349. Patented Mar. 26, 1867.
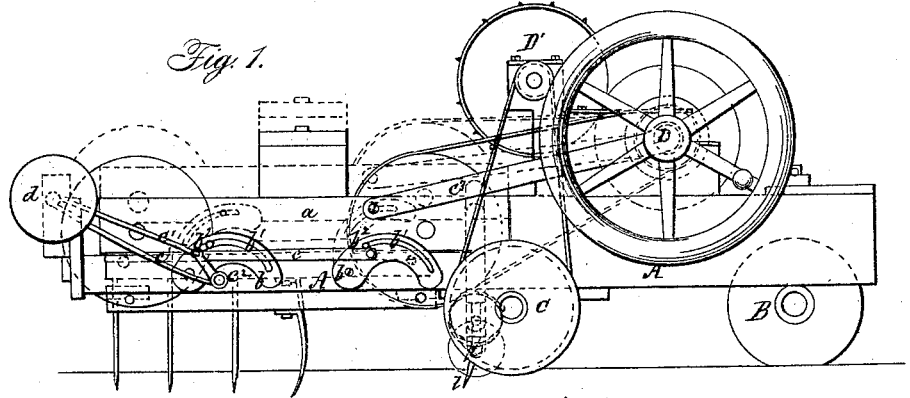
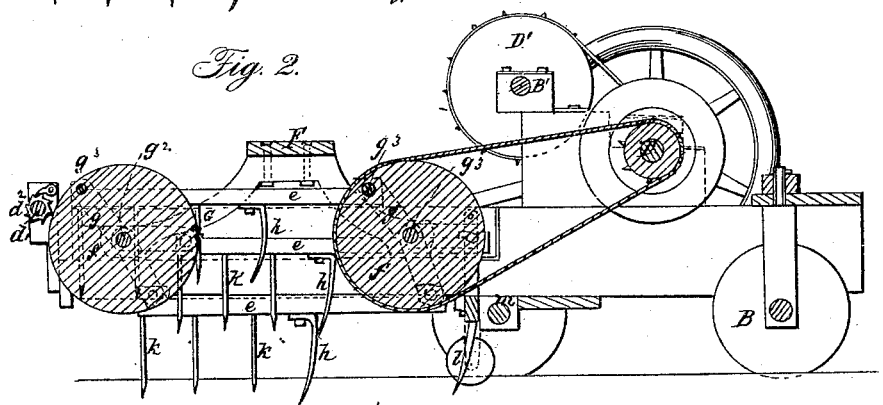
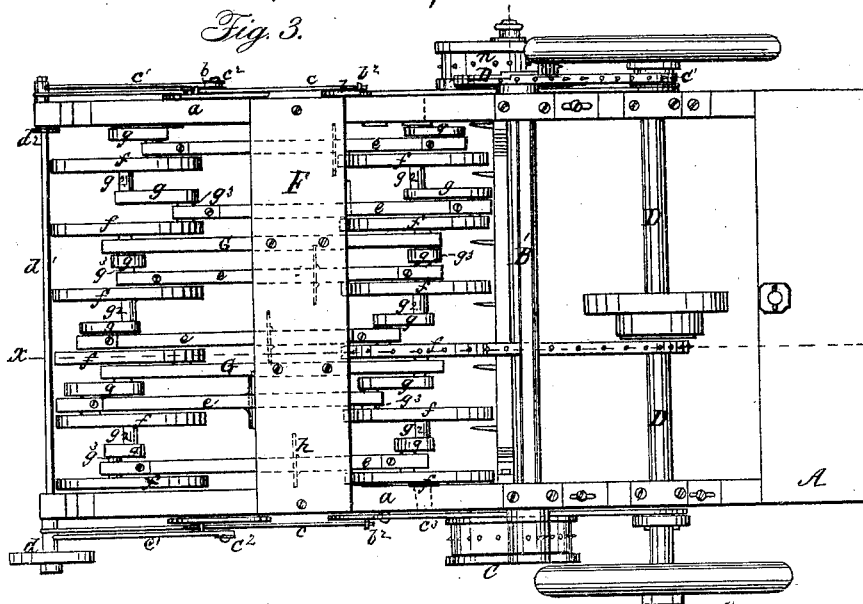
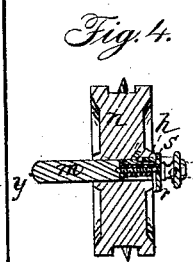
Witnesses:
M. Bailey
Chas. G. Page Jr.
Inventor:
George Willard
by A. Pollok
his atty

United States Patent Office.

GEORGE WILLARD, OF NEW YORK, N. Y.

*Letters Patent No.* 63,349, *dated March* 26, 1867.

---

IMPROVEMENT IN STEAM PLOUGHS.

---

The Schedule referred to in these Letters Patent and making part of the same.

---

TO WHOM IT MAY CONCERN:

Be it known that I, GEORGE WILLARD, of New York, in the county and State of New York, have invented certain new and useful improvements in Steam Ploughs; and I hereby declare the following to be a full, clear, and exact description of the same, reference being had to the accompanying drawings, in which—

Figure 1 is a side elevation of my improved plough.

Figure 2 is a longitudinal vertical section of the same on the line $x\,y$, fig. 3.

Figure 3 is a top view of the plough; and

Figure 4 is a section through one of the wheels.

My invention relates to that class of steam ploughs in which the mechanism for breaking the ground consists of a series of blades or spades so arranged as to enter the earth alternately and to turn up all the ground passed over by the machine; and it consists principally of an improved method of operating the spades, and the harrow or drag-teeth by which they are usually accompanied. It also consists in an improved mechanism for raising and lowering the frame in which the spades are supported, and in arranging the wheels upon which the machine runs, so that they may be fast or loose upon their axles, according as it is desired to move the machine directly ahead, or to turn it to the right or left.

According to my invention, the spades and drag-teeth are secured to rods connected at each end to compound crank-shafts, which are mounted parallel to each other in the movable frame of the machine. The connecting-rods are combined with the crank-shafts in such manner that they constantly maintain, during the entire throw of the cranks, their parallelism with the surface of the ground, and they are raised and lowered alternately, so that the spades and drag-teeth of each bar may enter the ground in succession, and thus offer a uniform and equal resistance. In front of the spades I attach to the movable frame a series of colters, which divide the turf into longitudinal strips, so as to enable the spades to work to better advantage; and the drag or harrow-teeth in rear thoroughly break the ground after it has been turned up by the spades. The frame in which the cranks and spades are hung is elevated or lowered by means of lever-arms or cams pivoted to the main frame, and having curved slots formed in them, in which are received pins attached to the movable frame. These cams on each side of the frame are connected or linked together, and are operated by means of a chain and wheel and ratchet, so as to hold the movable frame at any desired distance from the ground.

In order that these and other features of my invention may be the more readily understood, I will now proceed to describe the manner in which the same are or may be carried into effect, by reference to the accompanying drawings, in which I have represented that part of the steam plough in which my invention is comprised.

The main frame A is supported on wheels B C, the latter being the driving-wheels, or those to which motion is communicated from the driving-shaft D, through the medium of the shaft and wheels and pinions, B', C', D', &c., and belting, as represented in the drawings. In rear of the shaft B', and on top of the stationary frame A, is placed the movable frame $a$, in which the cranks, spades, &c., are supported. This frame consists of two side pieces, connected together and braced and strengthened as hereinafter described. It is raised and lowered by means of cams $b$, pivoted to the main frame, and provided with curved slots $b^1$, which receive pins $b^2$ inserted in the movable frame. The cams on each side of the frame are connected together by links $c$, operated by means of a chain or band, $c^1$, attached to one of the arms between its pivoted point and the slot $b^1$. The band $c^1$, after being thus secured, extends out a little further beyond the cam, passes around a pin, $c^2$, and thence returns to the wheel $d$, to the shaft of which it is fastened; so that by turning the wheel $d$ in one direction or the other the frame may be elevated or lowered, as is shown plainly in red and black lines in fig. 1. The cams on both sides of the frame are arranged in the same manner, and are operated simultaneously by means of the rod or shaft $d^1$, (fig. 3,) supported in bearings formed in the sides of the movable frame and carrying the wheel $d$. The frame is held at any desired elevation by means of the pawl and ratchet $d^2$, and is steadied by means of vibrating arms or links $c^3$, one end of which on each side of the machine is mounted on the driving-shaft D, and the other pivoted or otherwise suitably secured to the sides of the movable frame. The mechanism by which the spades are supported and operated consists of a series of bars, $e$, attached at each end to compound crank-shafts, the said shafts being mounted in the frame so as to be parallel with each other and to be side by side. These crank-shafts, as shown in the drawings, consist of a series of disks, $f$, the first and last of the series being supported in bearings in the respective sides of the frame, and all of them being united together by arms or cranks $g$. Each crank consists of three pieces, the arm proper, $g$, and the shorter pieces or wrists, $g^2$, $g^3$, which project out at right angles from the respective ends of the arm, so as to connect it with the disks between which it is placed, the piece $g^2$ being inserted in the centre of the one disk, while the other piece, $g^3$, is secured in the contiguous face of the next succeeding disk, at or near its circumference. The cranks upon each shaft are placed at angles with respect to each other, and the two shafts are, as above said, mounted in the movable frame so as to be parallel with each other, and so that the position and movement of their corresponding cranks, *i. e*, those in the same vertical plane, shall be in all respects identical. The connecting-rods e, which follow the movement of the cranks, will, therefore, be raised and lowered alternately, and maintained at all times parallel to the ground passed over by the machine. There may be as many cranks placed on the shafts as desired. In the drawings I have shown six, which are arranged, as above described, so that the spades enter and leave the ground alternately, and in such manner as to offer constant resistance. The rods or bars e carry the spades h and harrow-teeth k for turning up and breaking the ground. The series of harrow-teeth upon each rod or bar are placed in rear of the spades and extend obliquely or diagonally from one side to the other of the bar, so as to thoroughly break and pulverize the earth turned up by the spades. In the front part of the frame there is secured a bar or beam, to which colters l are attached, arranged so as to be opposite the intervals between the spades, and thus divide the turf into longitudinal strips, thereby enabling the spades and teeth which follow after to do their work more effectually and completely. In order to steady and strengthen the cranks and the frame in which they are supported, a brace, F, is extended across from one side to the other of the frame, so as to form a support for braces G, which are suitably secured to the pieces $g^2$, so as to form a centre bearing for each disk, if desired. Motion is communicated to the cranks by means of belting passing from the shaft B over one or more of the disks f, in the forward part of the frame a. Motion is transmitted to the cranks by any suitable means. In the drawings they are represented as receiving motion from a main shaft, D, which is also connected by gearing with the driving-wheel C, and by means of this gearing the movement of the wheel C should be made to bear such relation to that of the cranks that the machine shall not move forward more rapidly than the spades can be operated to turn up the ground.

The plough, although especially adapted to be used with steam power, may also be drawn by horses, &c. When steam power is used, motion is transmitted to both the wheel C and the cranks from the shaft D; but when horse power is employed, the driving-wheel C becomes the means by which the cranks are operated. When the machine is in operation, the colters l in the front part of the frame cut the turf into longitudinal strips, which are turned up by the spades h, and then broken and divided by the teeth K, which follow immediately after.

In order to be able to turn the machine with comparative facility, I propose to combine the wheels upon which it is supported with their axles or shafts in such manner that they may either move together or revolve separately. The means by which this effect is accomplished is shown in fig. 4. A recess is formed in the end of the shaft or axle m, upon which the wheel n is mounted, to receive the screw o and its surrounding spring p. Over the end of the axle is placed a plate or disk, r, pivoted on its exterior face with a stud or pin, S, of suitable form, which, when the plate is in place, fits tightly in a recess, S', one or more of which are formed partly in the axle and partly in the hub of the wheel. When the plate r is in place and the bolt o screwed down tightly upon it, compressing the spring p, the wheel and axle will revolve together. If, however, it be desired to turn the machine to the left, for instance, the bolt is unscrewed, thus leaving the spring p free to expand, in doing which it presses back the plate r, and removes the pin S from the recess in which it had its seat. The wheel and shaft are thus disconnected, and although the latter, together with the driving-wheel, continues to revolve, the wheel n is stationary, and the machine, as it were, turns upon a pivot.

The crank-shafts, by which the vibrating motion is imparted to the spades and harrow-teeth, instead of being constructed of a series of disks and interposed wrists, as shown in the drawing, may be formed like ordinary crank-shafts, the only essential being that the cranks upon each shaft should slant at angles to one another, and that the corresponding cranks upon the two shafts should be placed at similar angles, so as to preserve the alternate and parallel motion of the spade bars.

Having described my invention and the manner in which the same is or may be carried into effect, what I claim, and desire to secure by Letters Patent, is—

1. The combination, in a steam or other plough, as described, of the bars which carry the spades and other mechanism for breaking the ground, with the crank-shafts for operating the same, under the arrangement herein specified, so that the said bars, while alternately and successively moved towards and away from the earth, shall at all times maintain their parallelism with the surface passed over by the machine.

2. The combination, in the movable and adjustable plough frame, of the colters, with the vibrating spades and harrow-teeth, under the arrangement and for operation as set forth.

3. The combination, with the stationary plough-frame, of the movable frame and the cams and their operative mechanism for adjusting the same frame to different elevations above the ground, the whole being arranged and operating as herein shown and specified.

4. The herein-described mechanism for adjusting the movable plough frame, the same consisting of a series of cams arranged and connected with the stationary and movable frames on each side of the plough, as described, and operated by means of a shaft mounted in the stationary frame, and provided with a ratchet and pawl, so that the movable frame may be elevated and lowered, or held at any desired distance from the ground, substantially as shown and set forth.

5. The method of and means herein described for directing the movement of a steam plough or other like machine, that is to say, mounting the wheels of the said machine upon their axles or shafts in such manner that each wheel and its respective axle may revolve together, or independently of each other, substantially as and for the purposes set forth.

In testimony whereof I have signed my name to this specification before two subscribing witnesses.

GEORGE WILLARD.

Witnesses:
M. BAILEY,
EDM. F. BROWN.